US007482933B2

(12) United States Patent
Nauer (10) Patent No.: US 7,482,933 B2
(45) Date of Patent: Jan. 27, 2009

(54) RESONANCE TAG SYSTEM FOR A DATA MEDIUM PROVIDED WITH A METALLIZATION

(75) Inventor: Marcel Nauer, Oberägeri (CH)

(73) Assignee: Bibliotheca RFID Library Systems AG, Zug (CH)

( * ) Notice: Subject to any disclaimer, the term of this patent is extended or adjusted under 35 U.S.C. 154(b) by 0 days.

(21) Appl. No.: 10/588,262

(22) PCT Filed: Feb. 3, 2005

(86) PCT No.: PCT/CH2005/000061

§ 371 (c)(1),
(2), (4) Date: Apr. 23, 2007

(87) PCT Pub. No.: WO2005/076205

PCT Pub. Date: Aug. 18, 2005

(65) Prior Publication Data

US 2008/0036604 A1 Feb. 14, 2008

(30) Foreign Application Priority Data

Feb. 4, 2004 (CH) .................................... 0164/04

(51) Int. Cl.
*G08B 13/14* (2006.01)
(52) U.S. Cl. .................. 340/572.7; 340/572.1; 343/895
(58) Field of Classification Search ............. 340/572.1, 340/572.5, 572.7; 343/700, 866, 867, 895
See application file for complete search history.

(56) References Cited

U.S. PATENT DOCUMENTS 6,373,799 B1 * 4/2002 Ono et al. .................. 369/52.1

7,245,219 B2 * 7/2007 Tan et al. .................. 340/572.1

FOREIGN PATENT DOCUMENTS

| DE | 19920449 | 11/2000 |
|----|----------|---------|
| DE | 19963157 | 6/2001 |
| EP | 0996124 | 4/2000 |
| EP | 1031939 | 8/2000 |
| EP | 1302893 | 4/2003 |
| WO | 00/23994 | 4/2000 |
| WO | 2004/099821 | 11/2004 |

* cited by examiner

Primary Examiner—Davetta W. Goins
Assistant Examiner—Hongmin Fan
(74) Attorney, Agent, or Firm—Morgan Lewis & Bockius LLP (57) ABSTRACT

The invention relates to a resonant label (10) which is designed to be directly applied to a data carrier (20) that is provided with a metallization, such as a CD, DVD or an MO disc. To facilitate and/or improve the electromagnetic remote identification of said label using a frequency in the RF range, the label is equipped with an outer coil (12) that forms part of an electric resonant circuit and runs essentially around the outer edge of the data carrier (20). The resonant label (10) is preferably configured on a transparent substrate, so that it blends in with the data carrier (20) and permits an impression on the latter (20) to remain visible. The resonant label (10) can either be used as an entity in itself or in a particularly advantageous manner as a type of wave collector or booster for a smaller RFID label (30) that is located on the same data carrier. The label thus permits the remote identification of the RFID label (30), even if the data carrier (20) is completely metalized. Finally the resonant label can also be provided with a semiconductor chip and configured as an RFID.

6 Claims, 6 Drawing Sheets

RESONANCE TAG SYSTEM FOR A DATA MEDIUM PROVIDED WITH A METALLIZATION

TECHNICAL FIELD

The present invention concerns a resonance tag for applying to a data medium provided with a metallization, such as a CD, a DVD, or a MO, and for enabling and/or improving its remote electromagnetic identification with a frequency in the RF range, said resonance tag having an external winding as part of an electric oscillation circuit. Furthermore, the invention concerns special uses of such resonance tags.

PRIOR ART

Resonance tags with resonance frequencies in the RF range (radio frequency range) between 10 MHz and 20 MHz have already long been used to protect against theft of articles. The resonance tags, also known as transponders, are provided with an oscillation circuit, which is excited in an electromagnetic field attuned to its resonance frequency, for example, that of a transmitter placed in the exit area of a retail business, and it absorbs energy from the field. This absorption can be detected and subsequently an alarm, for example, can be triggered. The corresponding technology is also known as EAS (electronic article surveyance).

For some time now, moreover, resonance tags have been available that are outfitted with a semiconductor chip, which is connected to the oscillation circuit and can be provided with electrical energy and be made to respond by this means. Information regarding the identity of the object provided with the resonance tag can be stored in the semiconductor chip and interrogated or modified at a certain distance through radio frequency signals. The corresponding technology is known as RFID (radio frequency identification). RFID enables, besides theft prevention, a number of additional application possibilities, especially in the field of logistics and inventorization. In the library field, and also in video stores, the rental and stock taking system can be automated by means of RFID.

For both EAS and RFID applications, however, problems occur in connection with data media such as CDs, DVDs or MOs, which have a metallized surface as an optical reflection layer. This metallization absorbs and/or screens off a considerable portion of the power from the electromagnetic field generated for the communication with the resonance tags, and that is no longer available to the resonance tag. At very least, the range of the communication will suffer as a result.

To avoid this problem, the resonance tags are usually not even placed on the data media themselves, but rather on their containers, like the so-called jewel box in the case of CDs or DVDs. But this has obvious disadvantages, especially as regards theft protection, because the data media can usually be simply removed from their containers. As for inventory, the wrong data medium might be contained in a receptacle. Hence, there is a need to be able to provide even metallized data media directly with resonance tags.

Special RFID resonance tags are already known, these having a circular ring configuration and being so small that they can be glued in the interior zone of CDs or DVDs, not written with data and therefore also not always metallized, around the central hole, where they are also detectable with certain limitations. Yet even these special resonance tags no longer work with CDs or DVDs that are completely metallized, including the aforesaid interior zone.

There is a general trend to make the resonance tags as small in area as possible, because this saves on material during fabrication and the resonance tags on the whole can be produced more efficiently and economically. Also, of course, the resonance tags in general should take up as little space as possible on the articles provided with them, and be unobtrusive and unnoticeable.

PRESENTION OF THE INVENTION

The problem of the invention is to indicate how the communication with a resonance tag applied to a data medium with a metallized surface, such as a CD, a DVD or a MO, can be improved, or made possible for the first time in the case of totally metallized data media.

This problem is solved according to the invention by a resonance tag which can be applied to a data medium provided with a metallization, such as a CD, a DVD or a MO, which has an outer winding as part of its electrical oscillation circuit, and characterized in that the outer winding is led along the outer margin of the data medium.

Thanks to the outer winding laid with the largest possible circumference, an antenna structure is created, by which in surprising fashion so much power can be taken up or given off that the desired communication is still possible even with complete metallization of the data media.

According to a first preferred embodiment, the inventive resonance tag also has at least one inner winding as part of the electrical oscillation circuit, and between the outer and the at least one inner winding there is left a rather large interval, preferably at least corresponding to around half of the radius of the outer winding. For most applications, only one or in any case two inner windings will already be enough. The capacitor plates needed to form the capacitance of the oscillatory circuit can be arranged in the interval region between the outer and the at least one inner winding.

The resonance tag of the invention can be provided with a semiconductor chip and thus be formed as a RFID tag. Without its own semiconductor chip, it can be used for EAS applications or, with special advantage, in combination with one of the already mentioned special RFID tags, it can be used as a so-called booster label, as will be further explained hereafter.

In conventional manner, the resonance tag of the invention can be based on an electrically insulating substrate surface, on which the mentioned windings and the capacitor plates are formed as conduction tracks, and a semiconductor chip may also be placed thereon. In order for the text which is normally present on the data medium or the imprint which is likewise normally present to remain recognizable, the substrate should be transparent. This also holds, of course, for the means used to attach the substrate to the data medium, for which a transparent layer of glue can be used.

The recognizability of the text or the imprint on the data medium is also furthered in that the resonance tag of the invention, especially when it is configured for a resonance frequency of 13.56 MHz, uses only two or at most three narrow windings to form the inductance of the oscillatory circuit or the antenna structure, and a relatively large interval is left between the outer and the at least one inner winding. Thus, the windings are practically inconspicuous against the backdrop of the imprinting. The same holds for the capacitor plates, even when these are arranged in the interval region between the windings, because they can likewise be designed with relative small surface for the mentioned frequency.

In order to place the inventive resonance tag optimally on a CD, a DVD, or a MO, it is preferably in the shape of a ring, especially a circular ring. In that case, it also will not produce any disruptive imbalance on the data media when being played.

The metallization of the data media, besides the mentioned absorption and screening effect, also produces a certain detuning of the oscillatory circuit due to so-called stray capacitances, which may lead to the resonance frequency of the tag no longer matching precisely enough the frequency to which the rest of the electronics of the system has been set, especially the transmitter and receiver for detection of the resonance tags. Suitable means of counteracting this are a certain pretuning of the oscillatory frequency and/or enlarging the distance, albeit slightly, between the resonance tag and the data medium to reduce the stray capacitances, e.g., by an especially thick adhesive layer or an additional intermediate layer, especially by one with a particularly low dielectric constant $\epsilon$.

As already mentioned, the inventive resonance tag can also be used with particular advantage with another resonance tag with its own oscillatory circuit on the same data medium, as long as the two resonance tags an in mutual electromagnetic coupling. Of course, the oscillatory circuits of the two resonance tags should be tuned as precisely as possible to the same resonance frequency. The aforementioned detuning of the resonance frequencies may have to be taken into account.

An especially good mutual electromagnetic coupling results if the additional resonance tag is arranged entirely inside the windings of the inventive resonance tag. For in this region, the electromagnetic field of an external transmitter will be concentrated by the inventive resonance tag. Conversely, a signal generated by the additional tag will be picked up optimally there by the inventive resonance tag and emitted more effectively to the outside. In this way, the inventive resonance tag functions like a kind of wave collector or booster for the additional tag.

In this type of application, it is generally enough to have only the additional resonance tag be provided with a semiconductor chip and thus be configured as a RFID tag. Smaller tags can generally be outfitted with a semiconductor chip more economically than big ones.

The inventive resonance tag can also be galvanically and/or capacitively coupled with another resonance tag, configured as a RFID tag. In this case, the oscillatory circuit inductance of the additional resonance tag is not needed in its quality as an antenna. In this case it is favorable to shield it by special shielding surfaces. The shielding surfaces can be configured, e.g., on the inventive resonance tag.

On the other hand, the inventive resonance tag could in principle also be fashioned as a single piece with the other tag on the same substrate. For example, this might be advisable because larger tags cannot be as easily detached from the data media as smaller tags, which might be an important factor in theft prevention.

BRIEF EXPLANATION OF THE FIGURES

The invention will now be explained in further detail by means of sample embodiments in conjunction with the drawing. This shows:

FIG. 1, a first embodiment of a resonance tag according to the invention for EAS applications, specifically, in FIG. 1a, a top view of its front side, and in FIG. 1b, schematically, in cross section (A-A);

WAYS OF IMPLEMENTING THE INVENTION

Figure 1A:
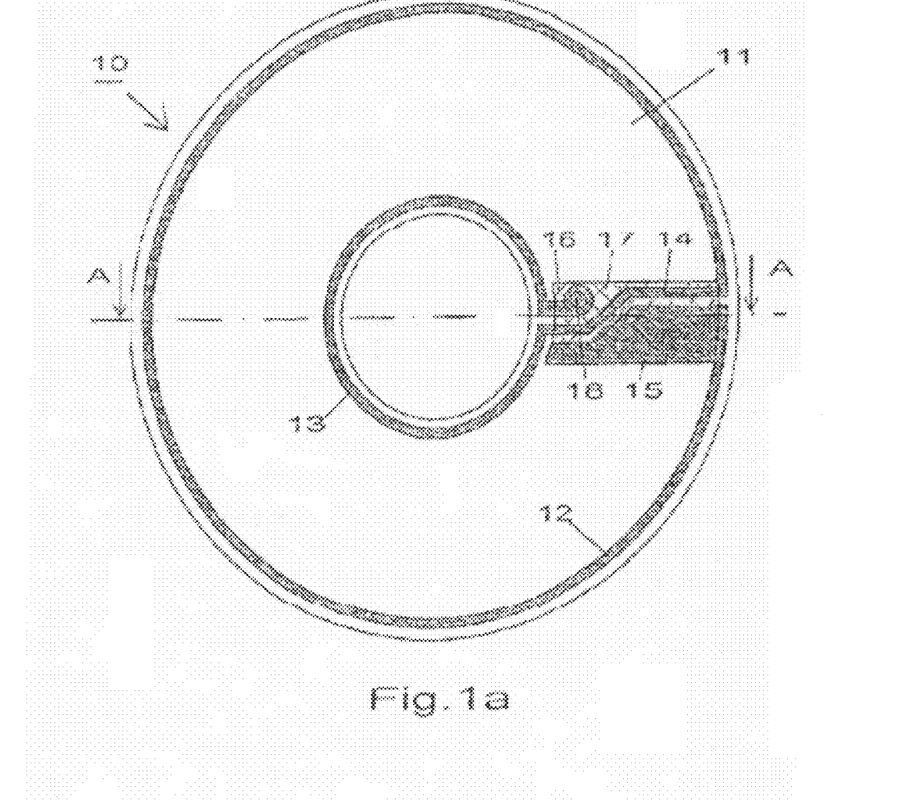
Figure 1B:
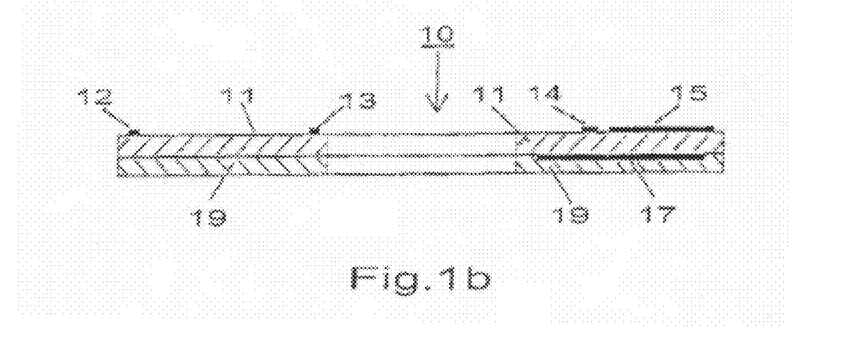

The resonance tag 10 of FIG. 1 has, on a circular transparent film substrate 11 with central hole, front and rear conductor tracks made of aluminum, for example, which together form an electrical oscillatory circuit with coil or inductance and capacitance or capacitor. The oscillatory circuit can be tuned, e.g., to a frequency in the RF range of 13.56 MHz. On the front side, depicted in FIG. 1a, the conductor tracks comprise an outer winding 12, an inner winding 13, and a cross connection 14 between the outer 12 and the inner 13 winding. The free end of the outer winding 12 adjoins a first capacitor plate 15 and the free end of the inner winding adjoins a contact zone 16. A second capacitor plate 17 corresponding to the first capacitor plate 15 is formed on the rear side of the film substrate overlapping with the first capacitor plate 15 and because of the transparency of the film substrate it is partially visible through this. Thanks to a through contact 18, formed for example by means of a crimping, the contact zone 16 is electrically connected to the second capacitor plate 17 on the rear side through the film substrate 11. The rear side of the substrate 11 is further provided with a likewise transparent adhesive layer 19.

Between the outer winding 12 and the inner winding 13, which together form the oscillatory circuit inductance, there is left an unusually large spacing. In this spacing region, only the capacitor plates 15 and 17 are arranged. The outer winding 12 encloses on the whole a relatively large surface.

Figure 2:
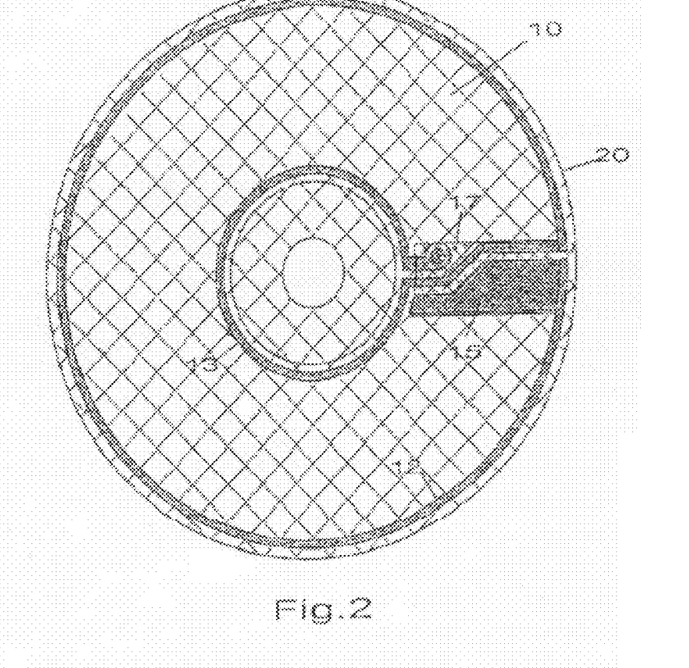
FIG. 2, the resonance tag of FIG. 1, glued onto a CD.

FIG. 2 shows the resonance tag 10 of FIG. 1 in top view, glued by means of an adhesive layer 19 onto a CD 20, made noticeable with a rough cross hatching, which is to be provided with a metallic reflection layer, as is generally the case with CDs. The size of the resonance tag 1 is adapted to the size of the CD 20 so that it reaches rather exactly to its outer rim. The outer winding 12 of the resonance tag 10 runs essentially along the outer rim of the CD 20. Thanks to this configuration, the resonance tag 10 itself can still be easily detected in front of the metallization layer of the CD 20.

In the spacing region between the outer 12 and the inner winding 13, one notices through the transparent film substrate 11 and through the transparent adhesive layer 19 the surface of the CD 20 and an imprint which may be located there. Thus, despite its size, the resonance tag 10 can also be placed on preprinted CDs, and their imprint will remain visible. The two capacitor plates 15 and 17 are hardly obtrusive in this case.

Figure 3:
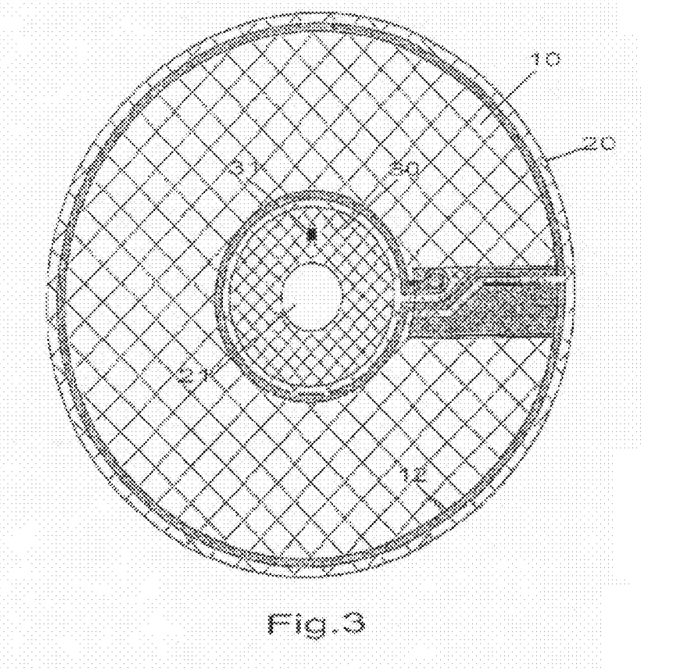
FIG. 3, the CD of FIG. 3 with another tag in its central zone, which is a RFID tag.
Figure 5:
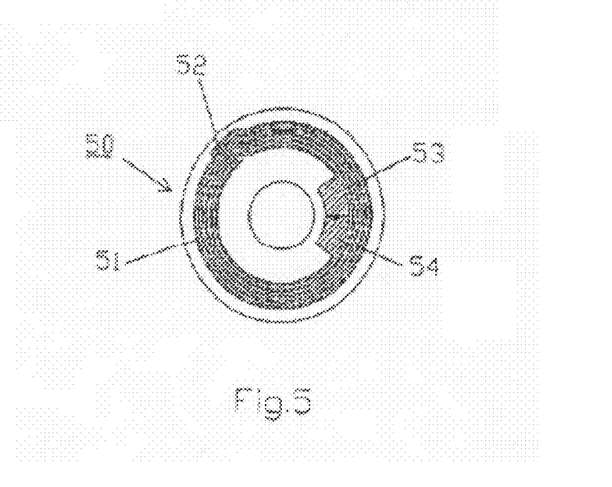
FIG. 5, a RFID tag corresponding to that of FIG. 3, with windings forming an antenna structure.

FIG. 3 shows the resonance tag 10 of FIG. 1 in a preferred use, once again glued onto a CD 20 along with a substantially smaller, likewise circular resonance tag 30, arranged concentrically to or in it. This can be one of the special resonance tags mentioned previously, for example. The exact configuration of this additional resonance tag 30 is not shown in greater detail in FIG. 3, nor is it of further significance to the present discussion. One example of its possible configuration, again with several windings preferably traveling about its center along the outer rim to form an oscillatory circuit inductance, is shown in FIG. 5. Furthermore, it should be outfitted with a semiconductor chip 31 and thus be configured as a RFID tag. It does not have to be transparent.

In the depicted arrangement, the larger resonance tag 10 acts like a wave collector for the smaller resonance tag 30, in that it picks up extremely effectively the electromagnetic field of an outer transmitter and relays it by electromagnetic coupling to the other resonance tag 30 at the interior. On the other hand, the resonance tag 10 effectively picks up signals emitted by the additional resonance tag 30 and relays them effectively to the outside. The additional resonance tag 30 in this configuration can still be detected and can still respond when the CD 20 is entirely metallized, i.e., inwardly as far as its central hole 21.

Favorable for the mutual coupling of the two resonance tags 10 and 30 is the fact that the inner winding 13 of the resonance tag 10 is arranged relatively far inside and only with slight spacing from the windings (not shown) of the other tag 30. By varying the radius of the inner winding 13, this degree of coupling can even be adjusted advantageously within certain limits, as needed.

Figure 4:
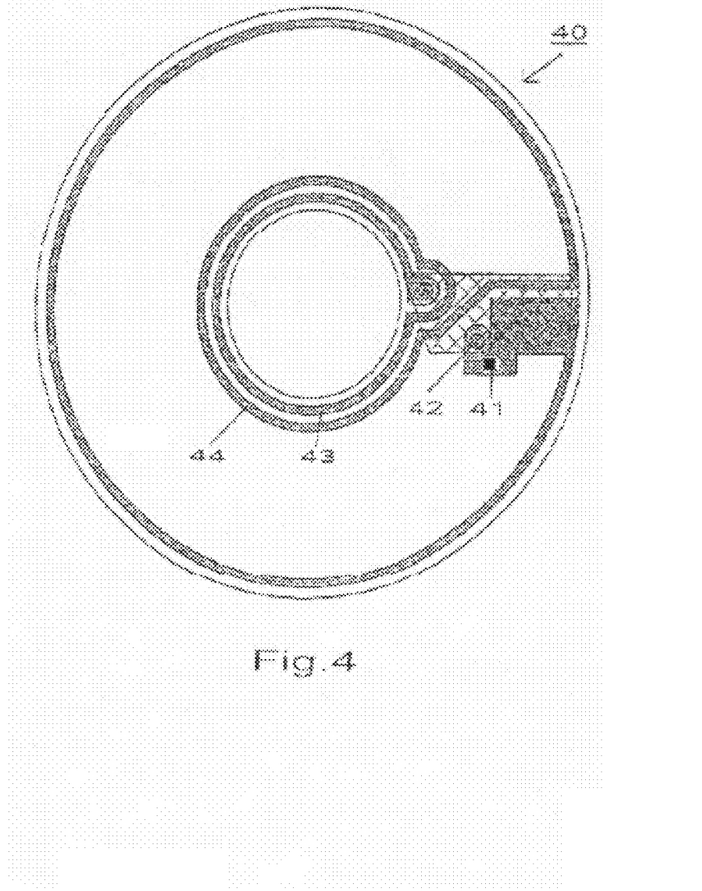
FIG. 4, a second embodiment of a resonance tag according to the invention with a semiconductor chip for RFID applications.

The resonance tag 40 shown in FIG. 4 basically corresponds to that of FIG. 1, but with the difference that it is itself provided with a semiconductor chip 41 and is accordingly configured as a RFID tag. Thus, it is possible to use the resonance tag 40 of FIG. 4 as the RFID tag, instead of the two resonance tags 10 and 30 of FIG. 3. Placing the semiconductor chip 41 on the large surface of the resonance tag 40 is especially easy and can be done efficiently making use of the so-called I "connect" concept of the Phillips company, in which the chip is first mounted on a rather large strip provided with contacts and instead of the chip one only needs to mount the much more easily handled strip. Yet another through contact 42 is provided to connect the semiconductor chip 41 to the oscillatory circuit.

On the example of the resonance tag of FIG. 4, it can also be seen that the resonance tags of the invention can be provided with more than just two windings. Thus, in the resonance tag of FIG. 4, there are two inner windings 43 and 44, closely neighboring each other. More windings generally means more transformed field flux and thus a higher voltage on the semiconductor chip, which thus responds sooner. On the other hand, however, one will try to make do with the fewest possible windings, if only because one wishes to cover the surface of the data medium as little as possible in the region where it is usually provided with an imprint.

FIG. 5 shows, as already mentioned, a circular RFID tag 50, which can correspond in its construction, its function, and its size to the tag 30 of FIG. 3. On a film substrate, it has several windings 51 led around its center 51 to form the oscillatory circuit inductance. At the same time, the windings 51 also form the antenna of the RFID tag 50. A contact bridge 52 insulated against the other windings connects the innermost winding to the outermost one. The two innermost windings emerge into contact zones 53 and 54, on which a semiconductor chip 55 is mounted. This contains an integrated capacitance as the oscillatory circuit capacitance.

Figure 6:
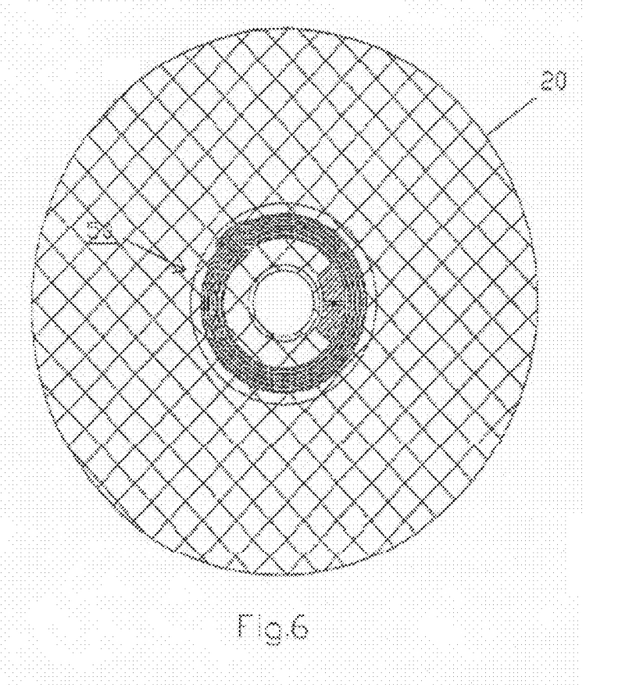
FIG. 6, a CD with RFID tag glued on, per FIG. 5.

By means of an adhesive layer on the back side, the RFID tag 50 in FIG. 6 is glued onto a CD 20 about its central hole. The CD, in turn, is made noticeable by a coarse cross hatching.

Figure 7:
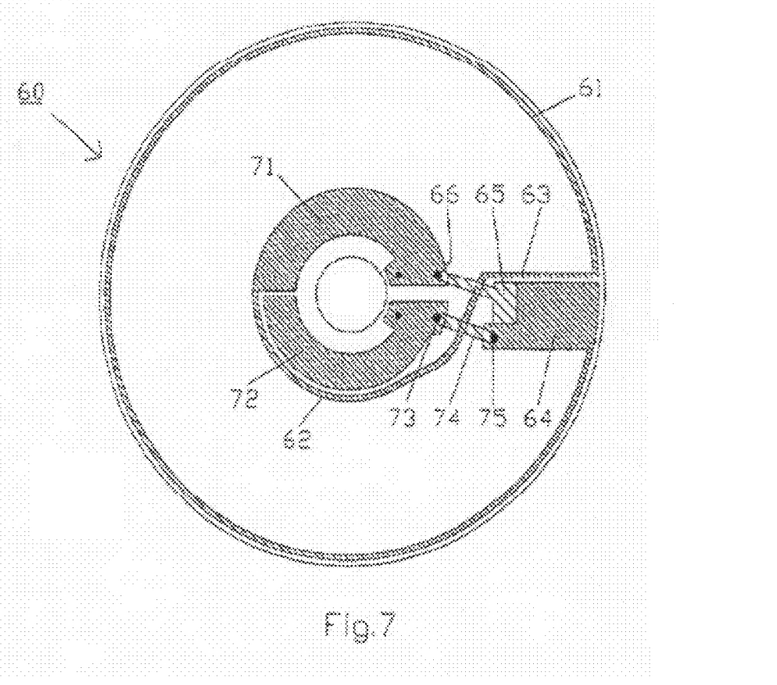
FIG. 7, a third embodiment of a resonance tag according to the invention, able to be galvanically connected to the RFID tag of FIG. 5.

FIG. 7 shows a third embodiment 60 of a resonance tag according to the invention, which can be combined with the RFID tag 50 of FIG. 5. It does not itself have a semiconductor chip and it corresponds largely in its construction to the resonance tag 10 of FIG. 1. In particular, like that one it has on a transparent film substrate an outer winding 61, an inner winding 62, a cross connection 63, a front capacitor plate 64, a rear capacitor plate 65 and a through contact 66 to connect the inner winding 62 to the rear capacitor plate 65. On the back side, it is provided with an adhesive layer. Unlike the embodiment of FIG. 1, here the inner winding 62 in the region of its terminal half arc broadens out into a first electrically conducting shielding surface 71. A second electrically conducting shielding surface 72 is provided in approximate mirror image to the first shielding surface 71 and connected via a through contact 73 to a conductor track 74 on the back, which is connected by a further through contact 75 to the capacitor plate 64 on the front side.

Figure 8:
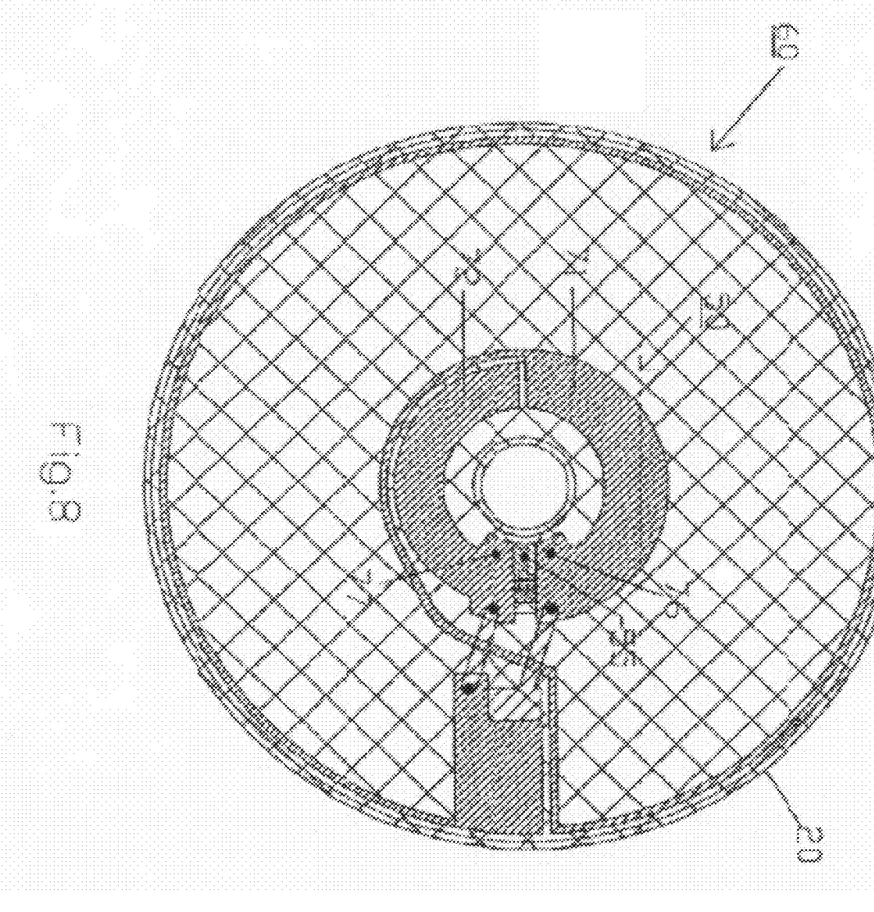
FIG. 8, the CD of FIG. 6 with additionally glued-on resonance tag per FIG. 7.

In FIG. 8, the resonance tag 60 of FIG. 7 is glued onto the CD 20 of FIG. 6 and over the RFID tag 50 already present there. Placed in this way, the resonance tag 60 overlaps with its two shielding surfaces 71 and 72 the windings 51 serving the RFID tag 50 as an antenna, among other things, and screens them off against external electromagnetic fields. At sites 76 and 77, the two shielding surfaces 71 and 72 are additionally galvanically connected to the contact zones 53 and 54 of the RFID tag 50, likewise overlapped by them, and in this way to the semiconductor chip 56. The galvanic connection can be produced mechanically after gluing on the resonance tag 60 by so-called crimping, such as at the through contacts, and/or under action of heat, e.g., with a hot pin.

In the arrangement of FIG. 8, the antenna of the RFID tag formed by the windings 51 is rendered ineffective as an antenna by shielding and replaced by the antenna of the resonance tag 60. Since this one is formed by windings with larger radius, it is much more effective and enables a responding, a read and a write function of the semiconductor chip 55 of the RFID tag 50 even when such is no longer possible with the antenna of the RFID tag 50 itself.

In order for the two resonance tags 50 and 60 to be well matched to each other, their oscillatory circuits should be tuned as precisely as possible to the same resonance frequency, while here as well it is necessary to take into account the aforementioned detuning of the resonance frequencies.

Figure 9:
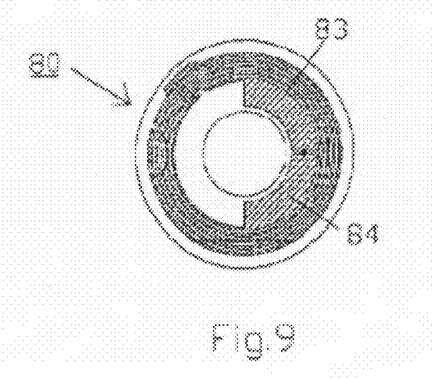
FIG. 9, another embodiment of a RFID tag.

FIG. 9 shows a RFID tag 80 corresponding to the RFID tag 50 of FIG. 5, where only the two contact zones 83 and 84 have been enlarged in area relative to the contact zones 53 and 54 of the tag 50.

Figure 10:
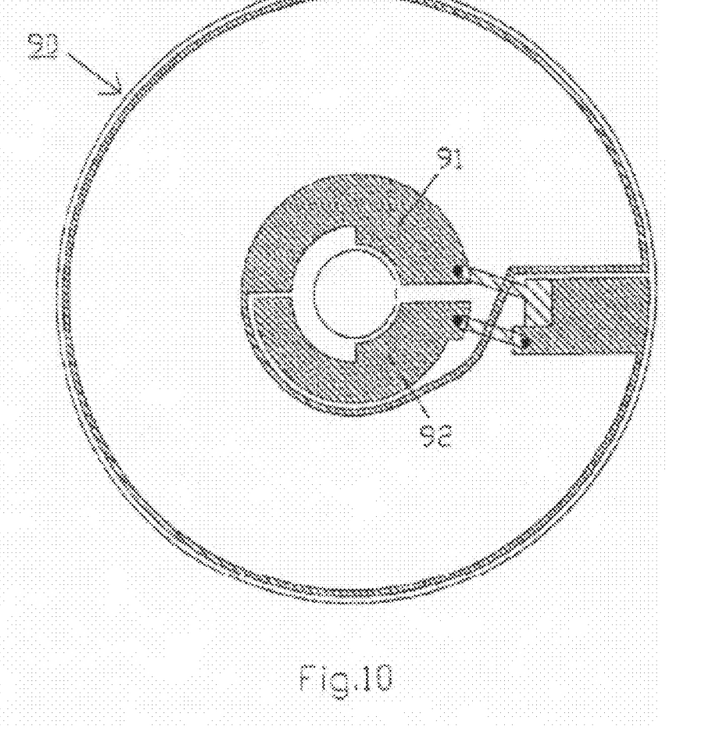
FIG. 10, a fourth embodiment of a resonance tag according to the invention, able to be capacitively coupled to the RFID tag of FIG. 9.

In FIG. 10, a fourth embodiment of a resonance tag 90 according to the invention is shown, which can be combined with the RFID tag of FIG. 9. It corresponds to the resonance tag of FIG. 7, with the difference that the two first and second shielding surfaces 91 and 92 are enlarged in area relative to the shielding surfaces 71 and 72 of the resonance tag 60, corresponding to the contact zones 83 and 84 of the RFID tag 80.

When the two tags 80 and 90 are glued one on top of the other in the manner of FIG. 8, the result is once again a shielding of the antenna architecture of the tag 90. Furthermore, there is produced a capacitive coupling between the enlarged contact zones 83 and 84, on the one hand, and the enlarged shielding surfaces 91 and 92, sufficient for coupling together the two tags 80 and 90 by signals, even without galvanic connections.

LIST OF REFERENCES 10 resonance tag
11 film substrate
12 outer winding
13 inner winding
14 cross connection
15 first capacitor plate
16 contact zone
17 second capacitor plate
18 through contact
19 adhesive layer
20 CD
21 central hole of CD
30 additional resonance tag
31 semiconductor chip of the additional resonance tag
40 resonance tag, second embodiment
41 semiconductor chip
42 through contact
43 inner winding
44 additional inner winding
50 RFID tag
51 windings/antenna of the RFID tag 50
52 contact bridge
53 contact zone
54 contact zone
55 semiconductor chip
60 resonance tag, third embodiment
61 outer winding
62 inner winding
63 cross connection
64 front capacitor plate
65 rear capacitor plate
66 through contact
71 first shielding surface
72 second shielding surface
73 through contact
74 rear conductor track
75 through contact
76 contact site
77 contact site
80 RFID tag
83 contact zone
84 contact zone
90 resonance tag, fourth embodiment
91 first shielding surface
92 second shielding surface

The invention claimed is:

1. A resonance tag system for a data medium provided with a metallization and for enabling and/or improving its remote electromagnetic identification with a frequency in the RF range, the resonance tag system comprising:
   a first resonant tag having an external winding as part of an electric oscillation circuit, wherein the outer winding is led essentially along the outer margin of the data medium; and
   a second resonance tag with its own oscillatory circuit in mutual electromagnetic coupling on the same data medium.

2. The resonance tag system of claim 1, wherein the second resonance tag is arranged completely inside at least one concentric winding of the first resonance tag.

3. The resonance tag system of claims 1 or 2, wherein the oscillatory circuits of the two resonance tags are tuned to the same resonance frequency at least on the data medium.

4. The resonance tag system of claim 3, wherein the second resonance tag is provided with a semiconductor chip, in which specific information regarding the particular data medium can be or is stored, and which semiconductor chip can be supplied with electric energy via the oscillatory circuit of the second resonance tag and can receive and transmit electromagnetic signals.

5. The resonance tag system of claim 1, wherein the first resonance tag has at least one shielding surface, together with the second resonance tag with its own oscillatory circuit on the same data medium, wherein the second resonance tag is provided with a semiconductor chip, in which specific information regarding the particular data medium can be or is stored, and which semiconductor chip can be supplied with electric energy via the oscillatory circuit of the second resonance tag when the second resonance tag is used alone, and can receive and transmit electromagnetic signals, while the at least one shielding surface of the first resonance tag shields the oscillatory circuit of the second resonance tag against receiving and transmitting of electric fields, and wherein the oscillatory circuit of the first resonance tag is galvanically and/or capacitively coupled with the semiconductor chip of the second resonance tag.

6. The resonance tag system of claim 5, wherein the first resonance tag and the second resonance tag are arranged concentrically to each other with partial overlapping.

* * * * *